(12) United States Patent
Shin

(10) Patent No.: US 9,785,843 B2
(45) Date of Patent: Oct. 10, 2017

(54) METHOD AND APPARATUS FOR TUNNEL DECISION

(71) Applicant: HYUNDAI MOBIS Co., Ltd., Yongin-si (KR)

(72) Inventor: Chang Mok Shin, Yongin-si (KR)

(73) Assignee: Hyundai Mobis Co., Ltd., Yongin-si (KR)

( * ) Notice: Subject to any disclaimer, the term of this patent is extended or adjusted under 35 U.S.C. 154(b) by 10 days.

(21) Appl. No.: 14/801,706

(22) Filed: Jul. 16, 2015

(65) Prior Publication Data

US 2016/0162741 A1    Jun. 9, 2016

(30) Foreign Application Priority Data

Dec. 5, 2014 (KR) .................. 10-2014-0173851

(51) Int. Cl.
*G06K 9/00* (2006.01)
*G06K 9/62* (2006.01)

(52) U.S. Cl.
CPC .................. *G06K 9/00791* (2013.01)

(58) Field of Classification Search
CPC ............. G06K 9/6267; G06K 9/00798; G06K 9/00791
USPC ........................................................ 382/104
See application file for complete search history.

(56) References Cited

U.S. PATENT DOCUMENTS

| | | | | |
|---|---|---|---|---|
| 7,566,851 B2 * | 7/2009 | Stein | ...................... | B60Q 1/143 250/205 |
| 2010/0097455 A1 * | 4/2010 | Zhang | ................ | G06K 9/00798 348/119 |
| 2010/0329513 A1 * | 12/2010 | Klefenz | .................. | G01C 21/00 382/104 |
| 2013/0321630 A1 * | 12/2013 | Shin | ........................ | G08G 1/167 348/148 |
| 2014/0029792 A1 * | 1/2014 | Kato | ........................ | B60Q 1/08 382/103 |

(Continued)

FOREIGN PATENT DOCUMENTS

| | | |
|---|---|---|
| JP | 2011-064700 | 3/2011 |
| JP | 2013-241065 | 12/2013 |
| KR | 10-2011-0132920 A | 12/2011 |

OTHER PUBLICATIONS

Sridhar S et al.—"Vision Based Tunnel Detection for Driver Assistance System." 5th International Conference—Confluence The Next Generation Information Technology Summit, Sep. 25, 2014, pp. 609-612.*

(Continued)

*Primary Examiner* — Jon Chang
(74) *Attorney, Agent, or Firm* — Hyunho Park; Mayer Brown LLP

(57) ABSTRACT

The present invention provides a tunnel decision apparatus, including: a camera which outputs an image of a view in front of a vehicle; a road area classifying unit which detects a vanishing point from the image of the view in front of a vehicle to output at least one of a road area and a non-road area; a pattern detecting unit which detects at least one of a lamp pattern from the non-road area and a lane pattern from the road area; and a tunnel decision unit which determines whether the vehicle enters a tunnel in consideration of at least one of the lamp pattern and the lane pattern.

14 Claims, 4 Drawing Sheets

(56) References Cited

U.S. PATENT DOCUMENTS

2015/0332101 A1* 11/2015 Takaki ..................... B60R 1/00
382/104

OTHER PUBLICATIONS

Urdzik et al. "Detection of Driving Space Using Vanishing Point Estimation." 8th International Symposium on Applied Machine Intelligence and Informatics, Jan. 28, 2010, pp. 323-328.*
Bui et al. "Road Area Detection Based on Texture Orientations Estimation and Vanishing Point Detection." Proceedings of the SICE Annual Conference, Sep. 14, 2013, pp. 1138-1143.*
Korean Intellectual Property Office, Office Action for Korean patent application No. 10-2014-0173851, Dec. 18, 2015, Korea.

* cited by examiner

METHOD AND APPARATUS FOR TUNNEL DECISION

CROSS-REFERENCE TO RELATED APPLICATIONS

The present application claims priority to Korean Patent Application Number 10-2014-0173851 filed Dec. 5, 2014, the entire contents of which application is incorporated herein for all purposes by this reference.

TECHNICAL FIELD

The present invention relates to a tunnel decision apparatus and a tunnel decision method, and more particularly, to a tunnel decision apparatus and a tunnel decision method which divides and outputs an image of a view in front of a vehicle into a non-road area and a road area with respect to a horizontal line including a vanishing point, detects a lamp pattern from the non-road area and detects a lane pattern from the road area to simultaneously detect the lamp pattern and the lane pattern, and determines whether the vehicle enters a tunnel or escapes the tunnel in consideration of a curvature and a gradient of the lane, and a heading direction.

BACKGROUND

A technology which assists a driver to conveniently and safely drive a car in complex and various road environments has been developed. Therefore, many vehicles adapt a driving assistance system (DAS). In order to adapt the DAS, a sensor function is also actively being developed.

When the vehicle drives in the tunnel, a sudden change of illumination among road environments may hinder a vehicle sensor from precisely recognizing an object. Therefore, in recent years, a technology which detects streetlamps of a tunnel in a predetermined pattern to determine whether the vehicle enters a tunnel or escapes the tunnel is being studied.

SUMMARY

The present invention has been made in an effort to provide a tunnel decision apparatus and a tunnel decision method which divides and outputs an image of a view in front of a vehicle into a non-road area and a road area with respect to a horizontal line including a vanishing point, detects a lamp pattern from the non-road area and detects a lane pattern from the road area to simultaneously detect the lamp pattern and the lane pattern, and determines whether the vehicle enters a tunnel or escapes the tunnel in consideration of a curvature, a gradient of the lane, and a heading direction.

Objects of the present invention are not limited to the above-mentioned objects, and other objects, which are not mentioned above, can be clearly understood by those skilled in the art from the following descriptions.

An exemplary embodiment of the present invention provides a tunnel decision apparatus, including: a camera which outputs an image of a view in front of a vehicle; a road area classifying unit which detects a vanishing point from the image of the view in front of a vehicle to output at least one of a road area and a non-road area; a pattern detecting unit which detects at least one of a lamp pattern from the non-road area and a lane pattern from the road area; and a tunnel decision unit which determines whether the vehicle enters a tunnel in consideration of at least one of the lamp pattern and the lane pattern.

The road area classifying unit may output a lower portion of a horizontal line including the vanishing point in the image of the view in front of a vehicle as the road area.

The road area classifying unit may output an upper portion of a horizontal line including the vanishing point in the image of the view in front of a vehicle as the non-road area.

The road area classifying unit may detect a horizontal line from a coordinate system set in the camera to output the road area and the non-road area.

The pattern detecting unit may detect a lamp pattern in consideration of brightness of a pixel in the non-road area.

The tunnel decision unit may determine whether the vehicle enters the tunnel in consideration of the lamp pattern and the lane pattern and at least one of a curvature, a heading direction, and a gradient of the lane pattern in the image of the view in front of a vehicle.

The tunnel decision unit may determine whether the vehicle escapes the tunnel in consideration of at least one of a duration time of detection and a detection frequency of the lamp pattern.

Another exemplary embodiment of the present invention provides a tunnel decision method, including: outputting an image of a view in front of a vehicle; detecting a vanishing point from the image of the view in front of a vehicle to output at least one of a road area and a non-road area; detecting at least one of a lamp pattern from the non-road area and a lane pattern from the road area; and determining whether the vehicle enters a tunnel in consideration of at least one of the lamp pattern and the lane pattern.

In the outputting of the road area, a lower portion of a horizontal line including the vanishing point in the image of the view in front of a vehicle may be output as the road area.

In the outputting of the road area, an upper portion of a horizontal line including the vanishing point in the image of the view in front of a vehicle may be output as the non-road area.

In the detecting of a pattern, the lamp pattern may be detected in the non-road area in consideration of a brightness of a pixel.

In the determining of whether the vehicle enters or escapes the tunnel, it may be determined whether the vehicle enters the tunnel in consideration of the lamp pattern and the lane pattern and at least one of a curvature, a heading direction, and a gradient of the lane pattern.

In the determining of whether the vehicle enters or escapes the tunnel, it may be determined whether the vehicle escapes the tunnel in consideration of at least one of a duration time of detection and a detection frequency of the lamp pattern.

Another exemplary embodiment of the present invention provides a tunnel decision method, including: outputting an image of a view in front of a vehicle; detecting a vanishing point from the image of the view in front of a vehicle to output at least one of a road area and a non-road area; and detecting a lamp pattern from the non-road area and detecting a lane pattern from the road area.

In the detecting of a lamp pattern and a lane pattern, the lamp pattern may be detected from the non-road area and the lane pattern is detected from the road area, simultaneously, in the image of the view in front of a vehicle.

The method may further include: simultaneously detecting the lamp pattern and the lane pattern and determining whether the vehicle enters the tunnel in consideration of the lamp pattern and the lane pattern and at least one of a curvature, a heading direction, and a gradient of the lane pattern.

The method may further include: determining whether the vehicle escapes the tunnel in consideration of a duration time of detection and a detection frequency of the lamp pattern when a vehicle feature similarity of the lane pattern is equal to or larger than a set value.

Specific items of other embodiments are included in the detailed description and the drawings.

According to a tunnel decision apparatus and a tunnel decision method of the present invention, there are one or more effects as follows:

First, a vanishing point is detected from the image of the view in front of a vehicle to output at least one of a road area and a non-road area.

Second, at least one of the lamp pattern in the non-road area and the lane pattern in the road area is detected to determine whether the vehicle enters the tunnel.

Third, the pattern detecting unit detects the lamp pattern in the non-road area in consideration of the brightness of the pixel.

Fourth, the tunnel decision unit determines whether the vehicle enters the tunnel in consideration of the lamp pattern and the lane pattern and at least one of a curvature, a heading direction, and a gradient of the lane pattern in the image of the view in front of a vehicle.

The effects of the present invention are not limited to the aforementioned effects, and other effects, which are not mentioned above, will be apparently understood by a person skilled in the art from the recitations of the claims.

DETAILED DESCRIPTION

Figure 1:
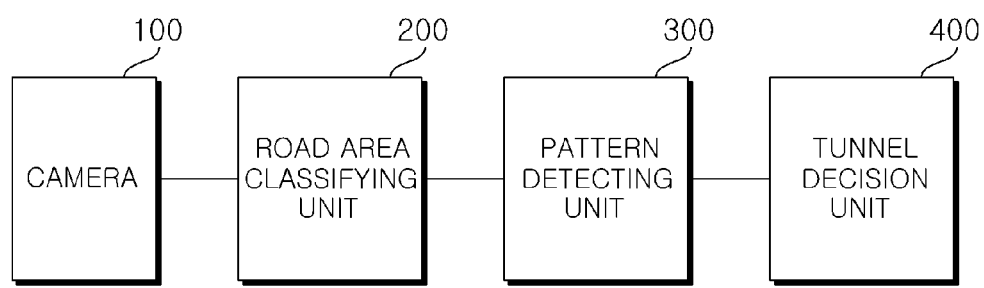
FIG. 1 is a diagram illustrating a configuration of a tunnel decision apparatus according to an exemplary embodiment of the present invention.

Advantages and characteristics of the present invention, and a method of achieving the advantages will be clear by referring to exemplary embodiments described below in detail together with the accompanying drawings. However, the present invention is not limited to exemplary embodiment disclosed herein but will be implemented in various forms. The exemplary embodiments are provided to enable the present invention to be completely disclosed and the scope of the present invention to be easily understood by those skilled in the art. Therefore, the present invention will be defined only by the scope of the appended claims. Like reference numerals indicate like elements throughout the specification.

Herein, the present invention will be described with reference to the drawings for explaining a tunnel decision apparatus according to an embodiment of the present invention.

FIG. 1 is a diagram illustrating a configuration of a tunnel decision apparatus according to an exemplary embodiment of the present invention. A tunnel decision apparatus according to an exemplary embodiment of the present invention includes a camera 100, a road area classifying unit 200, a pattern detecting unit 300, and a tunnel decision unit 400.

The camera 100 according to the exemplary embodiment outputs an image of a view in front of the vehicle to the road area classifying unit 200. The camera 110 is provided in a position which clearly photographs a lane and streetlamps which are present in front of a vehicle without being interrupted, inside or outside the vehicle.

The road area classifying unit 200 detects a vanishing point VP from an image of a view in front of the vehicle to output at least one of a road area RA and a non-road area NRA.

The road area classifying unit 200 detects a lane to calculate an intersecting point of the lanes as a vanishing point VP. The road area classifying unit 200 extracts a lane using a Kalman filter. The road area classifying unit 200 may detect a lane by detecting a candidate from the image of the view in front of the vehicle to which a gray-scale process and a binary process are subjected to perform a grouping process. The road area classifying unit 200 may detect the lane by checking effectiveness of the lane to merge grouped lane candidates.

The road area classifying unit 200 outputs a lower portion of a horizontal line including the vanishing point VP in the image of the view in front of the vehicle as a road area RA. The road area classifying unit 200 outputs an upper portion of the horizontal line including the vanishing point VP in the image of the view in front of the vehicle as a non-road area NRA. The road area classifying unit 200 may output the road area RA and the non-road area NRA with respect to an installation state of the camera 100.

The road area classifying unit 200 may output the road area RA and the non-road area NRA by detecting a horizontal line from a coordinate system set in the camera 100. The road area classifying unit 200 may detect a horizontal line whose gradient is horizontal (zero) from the coordinate system set in the image of the view in front of the vehicle output by the camera 100. The road area classifying unit 200 may output a lower portion of the detected horizontal line as a road area RA. The road area classifying unit 200 may output an upper portion of the detected horizontal line as a non-road area NRA.

Figure 2:
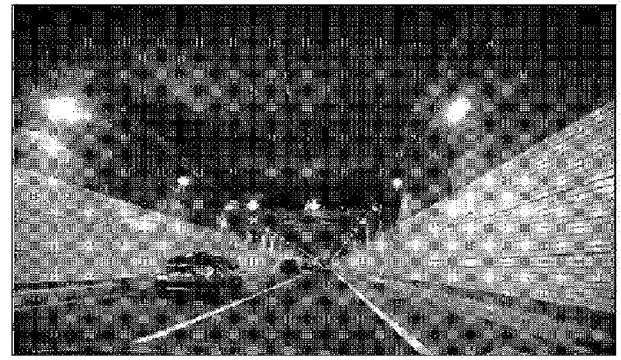
FIG. 2 is a view of an image of a view in front of a vehicle which is output with a road area and a non-road area in consideration of a vanishing point.
Figure 2:
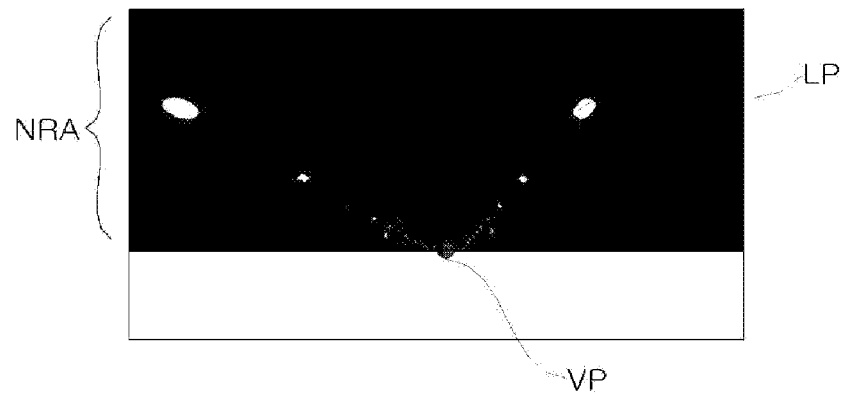
Figure 2:
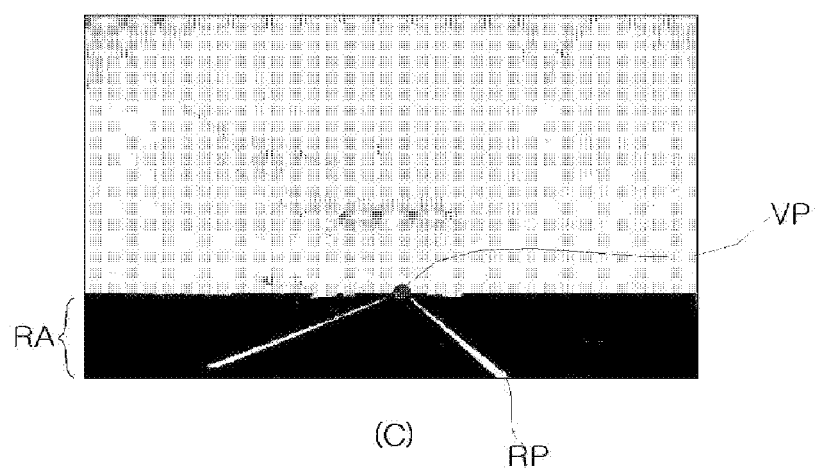

FIG. 2 illustrates that the road area classifying unit 200 outputs the road area RA and the non-road area NRA.

The pattern detecting unit 300 detects at least one of a lamp pattern LP from the non-road area and a lane pattern RP from the road area. The pattern detecting unit 300 detects a lamp pattern in consideration of brightness of a pixel in the non-road area.

The pattern detecting unit 300 detects the tunnel streetlamps in the non-road area NRA as a lamp pattern LP. The pattern detecting unit 300 determines whether a pixel brightness of the image of the view in front of the vehicle exceeds a set limiting value in consideration of a dark condition of the tunnel. The pattern detecting unit 300 extracts a part of the non-road area NRA where the pixel brightness exceeds the set limiting value as a lamp pattern candidate to detect the lamp pattern LP.

The pattern detecting unit 300 performs the gray-scale process on the image of the view in front of the vehicle. The pattern detecting unit 300 performs the binary process on the image of the view in front of the vehicle. The pattern detecting unit 300 detects the lamp pattern LP from the non-road area NRA of the image of the view in front of the vehicle to which the binary process is subjected. The pattern detecting unit 300 may detect the lamp pattern LP by performing a filtering process in accordance with a difference of the pixel brightness from the surrounding area to extract the lamp pattern candidate. The pattern detecting unit 300 detects the lamp pattern LP through a grouping process between a plurality of extracted lamp pattern candidates. The pattern detecting unit 300 may detect the lamp pattern LP excluding a lamp pattern candidate having a brightness which is equal to or smaller than a set brightness.

The pattern detecting unit 300 detects the lane pattern RP from the road area RA of the image of the view in front of the vehicle to which the gray-scale process and the binary process are subjected. The pattern detecting unit 300 may detect the lane pattern RP by extracting a part having a brightness which is larger than the set brightness as the lane pattern candidate. The pattern detecting unit 300 may detect the lane pattern RP by performing a filtering process in accordance with a difference of the pixel brightness from the surrounding area to extract the lane pattern candidate. The pattern detecting unit 300 detects the lane pattern RP through a grouping process between a plurality of extracted lane pattern candidates. The pattern detecting unit 300 may detect the lane pattern RP excluding a lane pattern candidate having a brightness which is equal to or smaller than a set brightness.

In the lamp pattern LP and the lane pattern RP detecting step, the pattern detecting unit 300 may simultaneously detect the lamp pattern LP from the non-road area NRA and the lane pattern RP from the road area RA from the image of the view in front of the vehicle.

The pattern detecting unit 300 may finally detect the lamp pattern LP by checking the effectiveness of the lamp pattern LP using a fact that intervals of the lamp patterns LP in the image of the view in front of the vehicle are regular. The tunnel decision unit 400 determines whether the vehicle enters the tunnel or escapes the tunnel in consideration of at least one of the lamp pattern LP and the lane pattern RP. When the lamp pattern LP and the lane pattern RP are simultaneously detected from the image of the view in front of the vehicle, the tunnel decision unit 400 may determine that the vehicle enters the tunnel. When the lamp pattern LP and the lane pattern RP are simultaneously detected and similarity of a curvature, a heading direction, and a gradient of the lane pattern RP is equal to or larger than a set similarity, the tunnel decision unit 400 determines that the vehicle enters the tunnel.

The tunnel decision unit 400 may set a reference curvature, a reference heading direction, and a reference gradient for curvatures, heading directions, and gradients of the lane pattern RP and the lamp pattern LP and calculate a similarity using the difference therebetween. The tunnel determining unit 400 sets a coordinate of the lamp pattern LP and the lane pattern RP detected from the coordinate system of the image of the view in front of the vehicle to calculate the curvature, the gradient, and the heading direction. When the lamp pattern LP and the lane pattern RP are simultaneously detected, the tunnel decision unit 400 may determine whether the vehicle enters the tunnel in consideration of the lamp pattern LP and the lane pattern RP, and at least one of the curvature, the heading direction, and the gradient of the lane pattern RP.

The lamp pattern LP and the lane pattern RP detected by the pattern detecting unit 300 have similarity in the heading direction, the gradient, and the curvature. The tunnel determining unit 400 determines whether the vehicle enters the tunnel in consideration of the lamp pattern LP and the lane pattern RP, and at least one of the curvature, the heading direction, and the gradient of the lane pattern RP in the image of the view in front of the vehicle.

The tunnel decision unit 400 determines whether the vehicle escapes the tunnel in consideration of at least one of a duration time and a detection frequency of the lamp pattern LP. The tunnel decision unit 400 determines whether the duration time of the detection of the lamp pattern LP output by the pattern detecting unit 300 is equal to or shorter than a set time. The tunnel decision unit 400 determines whether the detection frequency of the lamp pattern LP output by the pattern detecting unit 300 is equal to or smaller than a set value of the lamp pattern LP. When the detection time of the lamp pattern LP output by the pattern detecting unit 300 is equal to or shorter than the set time and the detection frequency of the lamp pattern LP output by the pattern detecting unit 300 is equal to or smaller than the set value of the lamp pattern LP, the tunnel decision unit 400 determines that the vehicle escapes the tunnel. When a lane feature similarity of the lane pattern RP is equal to or larger than a set value, the tunnel decision unit 400 may determine whether the vehicle escapes the tunnel in consideration of the detection duration time and the detection frequency of the lamp pattern LP.

FIG. 2 is a view of an image of a view in front of a vehicle which outputs a road area RA and a non-road area NRA by the road area classifying unit 200 in consideration of a vanishing point VP.

FIG. 2A is an image of a view in front of a vehicle output by the camera 100 according to an exemplary embodiment. The road area classifying unit 200 detects a vanishing point VP from an image of a view in front of the vehicle to output at least one of a road area and a non-road area. FIG. 2B is an image that the road area classifying unit 200 outputs the non-road area NRA and performs the gray-scale process and the binary process. FIG. 2B is an image that the road area classifying unit 200 outputs the road area RA and performs the gray-scale process and the binary process.

The road area classifying unit 200 detects a lane from the image of the view in front of the vehicle to calculate an intersecting point of the lanes as a vanishing point VP. The road area classifying unit 200 extracts a lane from the image of the view in front of the vehicle using a Kalman filter. The road area classifying unit 200 may detect a lane candidate from the image of the view in front of the vehicle to which a gray-scale process and a binary process are subjected to perform a grouping process to detect the lane. The road area classifying unit 200 may detect the lane by checking effectiveness of the lane to merge grouped lane candidates.

The road area classifying unit 200 outputs a lower portion of a horizontal line including the vanishing point VP in the image of the view in front of the vehicle as a road area RA. The road area classifying unit 200 outputs an upper portion of the horizontal line including the vanishing point VP in the image of the view in front of the vehicle as a non-road area NRA. The road area classifying unit 200 may output the road area RA and the non-road area NRA with respect to an installation state of the camera 100. The road area classifying unit 200 may output the road area RA and the non-road area NRA by detecting a horizontal line from a coordinate system set in the camera 100. The road area classifying unit 200 may detect a horizontal line whose gradient is horizontal (zero) from the coordinate system set in the image of the view in front of the vehicle output by the camera 100. The road area classifying unit 200 may output a lower portion of the detected horizontal line as a road area RA. The road area classifying unit 200 may output an upper portion of the detected horizontal line as a non-road area NRA.

The pattern detecting unit 300 detects at least one of a lamp pattern LP from the non-road area NRA and a lane pattern RP from the road area RA. The pattern detecting unit 300 detects the lamp pattern LP from the non-road area NRA in consideration of the brightness of the pixel.

The pattern detecting unit 300 detects the tunnel streetlamps in the non-road area NRA as a lamp pattern LP. The pattern detecting unit 300 determines whether a pixel brightness of the image of the view in front of the vehicle exceeds a set limiting value in consideration of a dark condition of the tunnel. The pattern detecting unit 300 extracts a part of the non-road area NRA where the pixel brightness exceeds the set limiting value as a lamp pattern candidate to detect the lamp pattern LP.

The pattern detecting unit 300 performs the gray-scale process on the image of the view in front of the vehicle. The pattern detecting unit 300 performs the binary process on the image of the view in front of the vehicle. The pattern detecting unit 300 detects the lamp pattern from the non-road area NRA of the image of the view in front of the vehicle to which the binary process is subjected. The pattern detecting unit 300 may detect the lamp pattern LP by performing a filtering process in accordance with a difference of the pixel brightness from the surrounding area to extract the lamp pattern candidate. The pattern detecting unit 300 detects the lamp pattern LP through a grouping process between a plurality of extracted lamp pattern candidates. The pattern detecting unit 300 may detect the lamp pattern LP excluding a lamp pattern candidate having a brightness which is equal to or smaller than a set brightness.

The pattern detecting unit 300 detects the lane pattern RP from the road area RM of the image of the view in front of the vehicle to which the gray-scale process and the binary process are subjected. The pattern detecting unit 300 may detect the lane pattern RP by extracting a part having a brightness which is larger than the set brightness as the lane pattern candidate. The pattern detecting unit 300 may detect the lane pattern RP by performing a filtering process in accordance with a difference of the pixel brightness from the surrounding area to extract the lane pattern candidate. The pattern detecting unit 300 detects the lane pattern LP through a grouping process between a plurality of extracted lamp pattern candidates. The pattern detecting unit 300 may detect the lane pattern RP excluding a lane pattern candidate having a brightness which is equal to or smaller than a set brightness.

In the lamp pattern LP and the lane pattern RP detecting step, the pattern detecting unit 300 may simultaneously detect the lamp pattern LP from the non-road area NRA and the lane pattern RP from the road area RA from the image of the view in front of the vehicle.

The pattern detecting unit 300 may finally detect the lamp pattern LP by checking the effectiveness of the lamp pattern LP using a fact that intervals of the lamp patterns LP are regular.

An operation of the tunnel decision method according to an exemplary embodiment of the present invention configured as described above will be described below.

Figure 3:
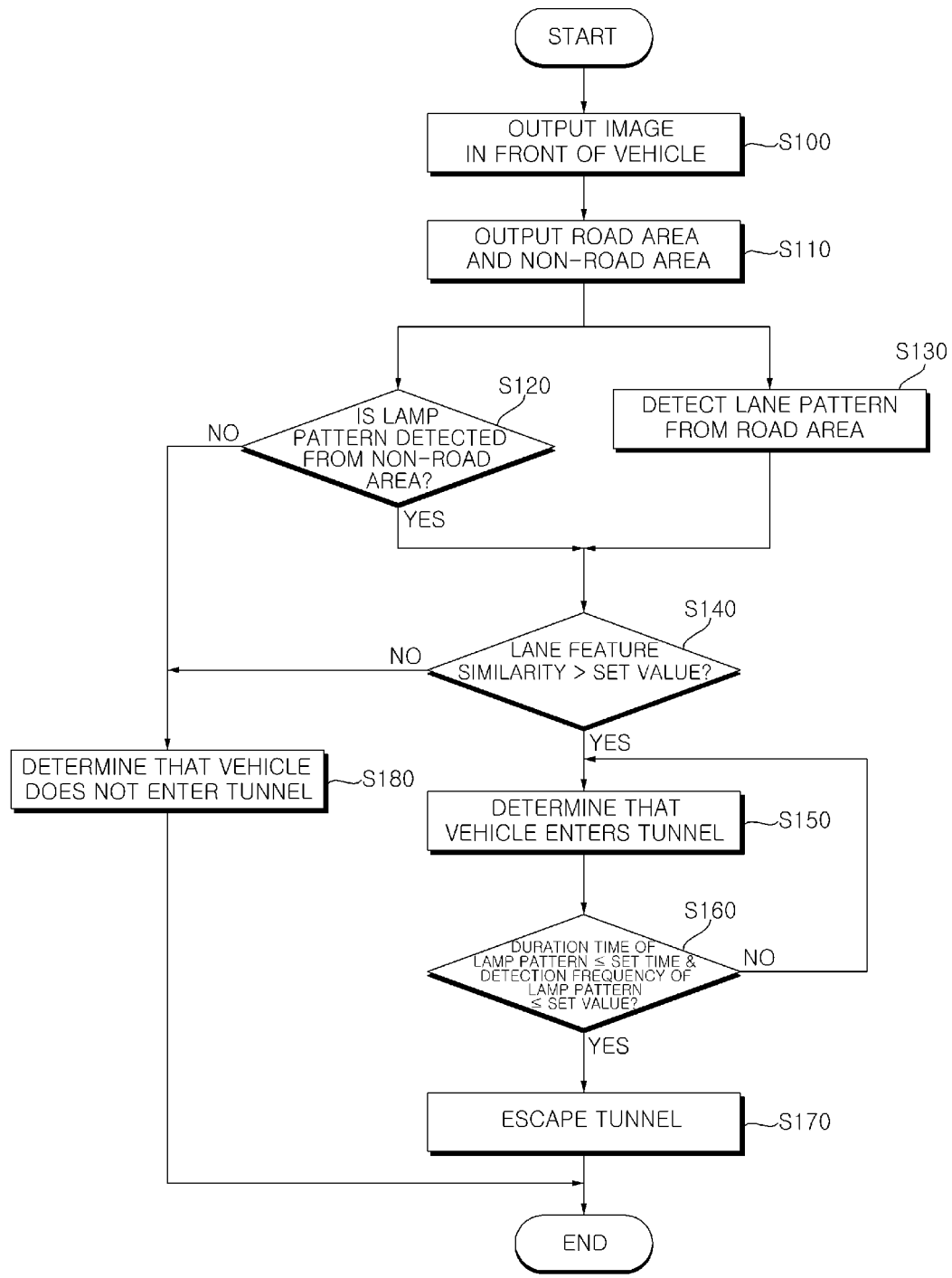
FIG. 3 is a control flowchart illustrating control flow of a tunnel decision method by the configuration illustrated in FIG. 1.

FIG. 3 is a control flowchart illustrating control flow of a tunnel decision method by the configuration illustrated in FIG. 1.

The camera 100 according to the exemplary embodiment outputs an image of a view in front of the vehicle to the road area classifying unit 200 in step S100. The camera 110 is provided in a position which clearly photographs a lane and streetlamps which are present in front of a vehicle without being interrupted, inside or outside the vehicle.

The road area classifying unit 200 detects a vanishing point VP from an image of a view in front of the vehicle to output at least one of a road area and a non-road area in step S110. The road area classifying unit 200 may detect a lane from the image of the view in front of the vehicle to calculate an intersecting point of the lanes as a vanishing point VP. The road area classifying unit 200 extracts a lane from the image of the view in front of the vehicle using a Kalman filter. The road area classifying unit 200 may detect a lane candidate from the image of the view in front of the vehicle to which a gray-scale process and a binary process are subjected to perform a grouping process to detect the lane.

The road area classifying unit 200 outputs a lower portion of a horizontal line including the vanishing point VP in the image of the view in front of the vehicle as a road area RA. The road area classifying unit 200 outputs an upper portion of the horizontal line including the vanishing point VP in the image of the view in front of the vehicle as a non-road area NRA. The road area classifying unit 200 may output the road area RA and the non-road area NRA with respect to an installation state of the camera 100.

The road area classifying unit 200 may output the road area RA and the non-road area NRA by detecting a horizontal line from a coordinate system set in the camera 100. The road area classifying unit 200 may detect a horizontal line whose gradient is horizontal (zero) from the coordinate system set in the image of the view in front of the vehicle output by the camera 100. The road area classifying unit 200 may output a lower portion of the detected horizontal line as a road area RA. The road area classifying unit 200 may output an upper portion of the detected horizontal line as a non-road area NRA.

FIG. 2 illustrates that the road area classifying unit 200 outputs the road area RA and the non-road area NRA.

The pattern detecting unit 300 detects the lamp pattern LP from the non-road area NRA in step S120. The pattern detecting unit 300 detects the lamp pattern LP from the non-road area NRA in consideration of the brightness of the pixel. The pattern detecting unit 300 detects the tunnel streetlamps in the non-road area NRA as a lamp pattern LP. The pattern detecting unit 300 determines whether a pixel brightness of the image of the view in front of the vehicle exceeds a set limiting value in consideration of a dark condition of the tunnel. The pattern detecting unit 300 extracts a part of the non-road area NRA where the pixel brightness exceeds the set limiting value as a lamp pattern candidate to detect the lamp pattern LP.

The pattern detecting unit 300 performs the gray-scale process on the image of the view in front of the vehicle. The pattern detecting unit 300 performs the binary process on the image of the view in front of the vehicle. The pattern detecting unit 300 detects the lamp pattern from the non-road area NRA of the image of the view in front of the vehicle to which the binary process is subjected. The pattern detecting unit 300 may detect the lamp pattern LP by performing a filtering process in accordance with a difference of the pixel brightness from the surrounding area to extract the lamp pattern candidate. The pattern detecting unit 300 detects the lamp pattern LP through a grouping process between a plurality of extracted lamp pattern candidates. The pattern detecting unit 300 may detect the lamp pattern LP excluding a lamp pattern candidate having a brightness which is equal to or smaller than a set brightness.

The pattern detecting unit 300 detects the lane pattern RP from the road area RA while detecting the lamp pattern LP from the non-road area NRA in step S130. The pattern detecting unit 300 detects the lane pattern RP from the road area RM of the image of the view in front of the vehicle to which the gray-scale process and the binary process are subjected. The pattern detecting unit 300 may detect the lane pattern RP by extracting a part having a brightness which is larger than the set brightness as the lane pattern candidate. The pattern detecting unit 300 may detect the lane pattern RP by performing a filtering process in accordance with a difference of the pixel brightness from the surrounding area to extract the lane pattern candidate. The pattern detecting unit 300 detects the lane pattern LP through a grouping process between a plurality of extracted lamp pattern candidates. The pattern detecting unit 300 may detect the lane pattern RP excluding a lane pattern candidate having a brightness which is equal to or smaller than a set brightness.

In the lamp pattern LP and the lane pattern RP detecting step, the pattern detecting unit 300 may simultaneously detect the lamp pattern LP from the non-road area NRA and the lane pattern RP from the road area RA from the image of the view in front of the vehicle.

The pattern detecting unit 300 may finally detect the lamp pattern LP by checking the effectiveness of the lamp pattern LP using a fact that intervals of the lamp patterns LP are regular.

The tunnel decision unit 400 calculates a lane feature similarity in consideration of the lamp pattern LP and the lane pattern RP, and at least one of the curvature, the heading direction, and the gradient of the lane pattern RP in the image of the view in front of the vehicle to determine whether the vehicle enters the tunnel in step S140. The tunnel decision unit 400 may set a coordinate of the lamp pattern LP and the lane pattern RP detected from the coordinate system of the image of the view in front of the vehicle to calculate the curvature, the gradient, and the heading direction. When the lamp pattern LP and the lane pattern RP are simultaneously detected, the tunnel decision unit 400 may determine whether the vehicle enters the tunnel in consideration of the lamp pattern LP and the lane pattern RP, and at least one of the curvature, the heading direction, and the gradient of the lane pattern RP in step S140.

The tunnel decision unit 400 determines that the vehicle enters the tunnel the tunnel in consideration of at least one of the lamp pattern LP and the lane pattern RP in step S150. When the lamp pattern LP and the lane pattern RP are simultaneously detected from the image of the view in front of the vehicle, the tunnel decision unit 400 may determine that the vehicle enters the tunnel. When the lamp pattern LP and the lane pattern RP are simultaneously detected and similarity of a curvature, a heading direction, and a gradient of the lane pattern RP is equal to or larger than a set similarity, the tunnel decision unit 400 determines that the vehicle enters the tunnel.

The tunnel decision unit 400 may set a reference curvature, a reference heading direction, and a reference gradient for curvatures, heading directions, and gradients of the lane pattern RP and the lamp pattern LP and calculate a similarity using the difference therebetween.

The tunnel decision unit 400 determines whether the vehicle escapes the tunnel in consideration of at least one of duration and a detection frequency of the lamp pattern in step S160. The tunnel decision unit 400 determines whether the duration time of the detection of the lamp pattern LP output by the pattern detecting unit 300 is equal to or shorter than a set time. The tunnel decision unit 400 determines whether the detection frequency of the lamp pattern LP output by the pattern detecting unit 300 is equal to or smaller than a set value of the lamp pattern LP. When a lane feature similarity of the lane pattern RP is equal to or larger than a set value, the tunnel decision unit 400 may determine whether the vehicle escapes the tunnel in consideration of the detection duration time and the detection frequency of the lamp pattern LP in step S160.

When the detection time of the lamp pattern LP output by the pattern detecting unit 300 is equal to or longer than the set time or the detection frequency of the lamp pattern LP is equal to or larger than the set value of the lamp pattern LP, the tunnel decision unit 400 continuously determines whether the vehicle escapes the tunnel.

When the duration time of the detection of the lamp pattern LP output by the pattern detecting unit 300 is equal to or shorter than the set time and the detection frequency of the lamp pattern LP output by the pattern detecting unit 300 is equal to or smaller than the set value of the lamp pattern LP, the tunnel decision unit 400 determines that the vehicle escapes the tunnel in step S170.

When the pattern detecting unit 300 does not detect the lamp pattern LP from the non-road area NRA, it is determined that the vehicle does not enter the tunnel environment in step S180. When the lane feature similarity is larger than the set value, the pattern detecting unit 300 may determine that the vehicle does not enter the tunnel environment in step S180.

Figure 4:
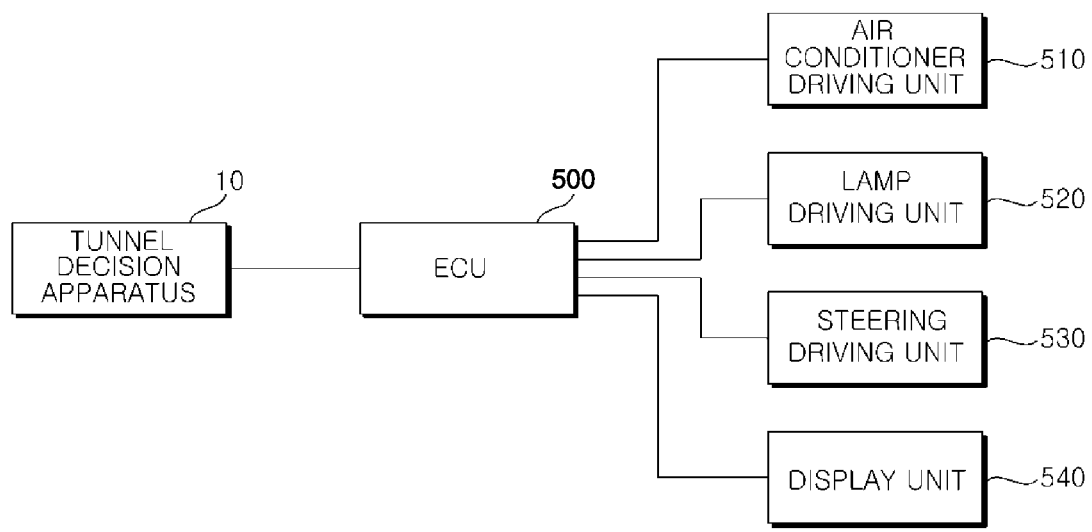
FIG. 4 is a block diagram of a vehicle according to an exemplary embodiment of the present invention.

FIG. 4 is a block diagram of a vehicle according to an exemplary embodiment of the present invention.

Referring to FIG. 4, a vehicle according to an exemplary embodiment of the present invention may include a tunnel decision apparatus 10, an ECU 500, an air conditioner driving unit 510, a lamp driving unit 520, a steering driving unit 530, and a display unit 540.

The air conditioner driving unit 510 controls an air conditioner device provided in the vehicle. The air conditioner driving unit 510 controls outdoor air to flow into the vehicle or indoor air to flow out from the vehicle. The air conditioner driving unit 510 controls to supply hot air or cold air into the vehicle.

The lamp driving unit 520 controls various lamps provided in the vehicle.

The steering driving unit 530 controls a steering device provided in the vehicle.

The tunnel decision apparatus 10 is a tunnel decision device described in detail with reference to FIGS. 1 to 3. The tunnel decision device 10 may transmit information in accordance with a determined result to the ECU 500.

The ECU 500 may perform overall electronic or electrical control of units included in the vehicle. The ECU 500 may receive information concerning whether the vehicle enters or escapes the tunnel, from the tunnel decision apparatus 10.

The ECU 500 may control at least one of the air conditioner driving unit 510, the lamp driving unit 520, the steering driving unit 530, and the display unit 540 based on the information concerning whether the vehicle enters or escapes the tunnel.

The ECU 500 may control the air conditioner driving unit 510 to control an operation of an air conditioner device, based on the information concerning whether the vehicle enters or escapes the tunnel. When the vehicle enters the tunnel, the ECU 500 controls the air conditioner driving unit 510 to prevent the outside air from flowing in the vehicle, based on information received from the tunnel decision apparatus 10. Further, when the vehicle escapes the tunnel, the ECU 500 controls the air conditioner driving unit 510 to allow the outside air to flow in the vehicle, based on information received from the tunnel decision apparatus 10.

The ECU 500 may control the lamp driving unit 520 to control to turn on or off various lamps based on the information concerning whether the vehicle enters or escapes the tunnel. When the vehicle enters the tunnel, the ECU 500 controls the lamp driving unit 520 to turn on at least one of a head lamp, a tail lamp, and an interior lamp, based on information received from the tunnel decision apparatus 10. Further, when the vehicle enters the tunnel, the ECU 500 controls the lamp driving unit 520 to turn off at least one of a head lamp, a tail lamp, and an interior lamp, based on information received from the tunnel decision apparatus 10.

The ECU 500 may control the steering driving unit 530 to control the steering of a vehicle based on the information concerning whether the vehicle enters or escapes the tunnel. When the vehicle enters the tunnel, the ECU 500 controls the steering driving unit 530 to prevent the lane from being changed, based on information received from the tunnel decision apparatus 10. When the vehicle enters the tunnel, the ECU 500 controls the steering driving unit 530 to allow the lane to be changed, based on information received from the tunnel decision apparatus 10.

The ECU 500 may display the information concerning whether the vehicle enters or escapes the tunnel on the display unit 540.

Preferred embodiments of the present invention have been illustrated and described above, but the present invention is not limited to the above-described specific embodiments, it is obvious that various modification may be made by those skilled in the art, to which the present invention pertains without departing from the gist of the present invention, which is claimed in the claims, and such modification should not be individually understood from the technical spirit or prospect of the present invention.

What is claimed is:

1. A tunnel decision apparatus, comprising:
   a camera, the camera outputting an image of a view in front of a vehicle;
   circuitry configured to detect a vanishing point from the image of the view in front of a vehicle to output at least one of a road area and a non-road area;
   circuitry configured to detect at least one of a lamp pattern from the non-road area and a lane pattern from the road area; and
   circuitry configured to determine whether the vehicle enters a tunnel in consideration of at least one of the lamp pattern and the lane pattern, and whether the vehicle escapes the tunnel in consideration of at least one of a duration time of detection and a detection frequency of the lamp pattern.

2. The tunnel decision apparatus of claim 1, wherein the circuitry configured to detect the vanishing point from the image of the view in front of a vehicle outputs a lower portion of a horizontal line including the vanishing point in the image of the view in front of a vehicle as the road area.

3. The tunnel decision apparatus of claim 1, wherein the circuitry configured to detect the vanishing point from the image of the view in front of a vehicle outputs an upper portion of a horizontal line including the vanishing point in the image of the view in front of a vehicle as the non-road area.

4. The tunnel decision apparatus of claim 1, wherein the circuitry configured to detect the vanishing point from the image of the view in front of a vehicle detects a horizontal line from a coordinate system set in the camera to output the road area and the non-road area.

5. The tunnel decision apparatus of claim 1, wherein the circuitry configured to detect at least one of a lamp pattern from the non-road area and a lane pattern from the road area detects the lamp pattern in consideration of a brightness of a pixel in the non-road area.

6. The tunnel decision apparatus of claim 1, wherein the circuitry configured to determine whether the vehicle enters a tunnel determines whether the vehicle enters the tunnel in consideration of the lamp pattern, the lane pattern and at least one of a curvature, a heading direction, and a gradient of the lane pattern in the image of the view in front of a vehicle.

7. A tunnel decision method, comprising:
   outputting an image of a view in front of a vehicle;
   detecting a vanishing point from the image of the view in front of a vehicle to output at least one of a road area and a non-road area;
   detecting at least one of a lamp pattern from the non-road area and a lane pattern from the road area;
   determining whether the vehicle enters a tunnel in consideration of at least one of the lamp pattern and the lane pattern, and
   determining whether the vehicle escapes the tunnel in consideration of at least one of a duration time of detection and a detection frequency of the lamp pattern.

8. The tunnel decision method of claim 7, wherein in the outputting of the road area, a lower portion of a horizontal line including the vanishing point in the image of the view in front of a vehicle is output as the road area.

9. The tunnel decision method of claim 7, wherein in the outputting of the road area, an upper portion of a horizontal line including the vanishing point in the image of the view in front of a vehicle is output as the non-road area.

10. The tunnel decision method of claim 7, wherein in the detecting of a pattern, the lamp pattern is detected in the non-road area in consideration of a brightness of a pixel.

11. The tunnel decision method of claim 7, wherein in the determining of whether the vehicle enters or escapes the tunnel, it is determined whether the vehicle enters the tunnel in consideration of the lamp pattern, the lane pattern, and at least one of a curvature, a heading direction, and a gradient of the lane pattern in the image of the view in front of a vehicle.

12. A tunnel decision method, comprising:
   outputting an image of a view in front of a vehicle;
   detecting a vanishing point from the image of the view in front of a vehicle to output at least one of a road area and a non-road area;
   detecting a lamp pattern from the non-road area;
   detecting a lane pattern from the road area, and
   determining whether the vehicle escapes a tunnel in consideration of a duration time of detection and a detection frequency of the lamp pattern when a vehicle feature similarity of the lane pattern is equal to or larger than a set value.

13. The tunnel decision method of claim 12, wherein in the detecting of a lamp pattern and a lane pattern, the lamp pattern is detected from the non-road area and the lane pattern is detected from the road area, simultaneously, in the image of the view in front of a vehicle.

14. The tunnel decision method of claim 13, further comprising:
   simultaneously detecting the lamp pattern and the lane pattern and determining whether the vehicle enters the tunnel in consideration of the lamp pattern, the lane pattern and at least one of a curvature, a heading direction, and a gradient of the lane pattern.

* * * * *